(12) United States Patent
Manos

(10) Patent No.: US 7,264,847 B2
(45) Date of Patent: Sep. 4, 2007

(54) LOWER ALKYL CARBOXYLIC ACID MOIETIES FOR PREVENTING OXIDATIVE CORROSION OF METALS AND ORGANOLEPTIC STABILIZER FOR FOOD AND BEVERAGES

(75) Inventor: Paul D. Manos, Pinehurst, NC (US)

(73) Assignee: Robert P. Bentley, Sr., Marathon, FL (US)

( * ) Notice: Subject to any disclaimer, the term of this patent is extended or adjusted under 35 U.S.C. 154(b) by 481 days.

(21) Appl. No.: 10/606,946

(22) Filed: Jun. 26, 2003

(65) Prior Publication Data

US 2004/0159823 A1 Aug. 19, 2004

Related U.S. Application Data

(60) Provisional application No. 60/448,153, filed on Feb. 19, 2003.

(51) Int. Cl.
*B05D 5/00* (2006.01)
*B05D 7/14* (2006.01)
*B05D 1/36* (2006.01)

(52) U.S. Cl. ............... 427/409; 427/203; 427/435

(58) Field of Classification Search .................. None
See application file for complete search history.

(56) References Cited

U.S. PATENT DOCUMENTS

| | | | |
|---|---|---|---|
| 4,401,624 A | 8/1983 | Atwater | |
| 4,642,221 A | 2/1987 | Hansen et al. | |
| 4,676,834 A | 6/1987 | Treybig | |
| 5,614,268 A * | 3/1997 | Varley et al. | ............... 427/486 |
| 5,653,917 A | 8/1997 | Singerman | |
| 6,103,294 A | 8/2000 | Bendiner | |
| 6,174,970 B1 | 1/2001 | Braune | |
| 6,248,700 B1 | 6/2001 | Vollmer et al. | |
| 6,267,802 B1 | 7/2001 | Baldrey et al. | |
| 6,500,360 B2 | 12/2002 | Bendiner | |
| 6,833,087 B2 * | 12/2004 | Beck et al. | ............... 252/389.1 |

FOREIGN PATENT DOCUMENTS

WO WO 02/42523 5/2002

* cited by examiner

*Primary Examiner*—William Phillip Fletcher, III
(74) *Attorney, Agent, or Firm*—Alston & Bird LLP

(57) ABSTRACT

Compositions and methods are disclosed for preventing the oxidative corrosion of metal surfaces by exposing a metal surface to an anti-corrosion agent characterized as a lower alkyl carboxylic acid or salts and/or other derivatives that conserve or embody the lower alkyl carboxylic acid moiety present in their molecular structures as an active anti-corrosion agent. The anti-corrosion agent may be used in combination with a material capable of forming a moisture retentive barrier over the metal surface. The compositions and methods of the invention provide a practical, non-toxic way of ensuring anti-corrosion protection for metals, or devices containing exposed metals, stored or operated in water or in the presence of water vapor. Exemplary, non-exhaustive uses of the invention include employing the composition as lubricant for the surface of a metal or as a pump oil or brake fluid; using the composition as an undercoating for painting, electro-plating or electro-polishing procedures; and providing a protective coating for any metal or metal-containing machine or device, form automotive assembly plant metal press machines to electronic circuit boards.

26 Claims, No Drawings

LOWER ALKYL CARBOXYLIC ACID MOIETIES FOR PREVENTING OXIDATIVE CORROSION OF METALS AND ORGANOLEPTIC STABILIZER FOR FOOD AND BEVERAGES

CROSS-REFERENCE TO RELATED APPLICATION

The present application claims the benefit of the filing date of U.S. Provisional Application No. 60/448,153 filed Feb. 19, 2003.

BACKGROUND OF THE INVENTION

Corrosion is a serious problem that affects and undermines the quality of everyday social life and the endurance of industrial products. Extensive efforts have been undertaken to design and fabricate products such as steam generators, heat exchangers, bridges, oil drilling platforms and motor vehicles that can resist the destructive effects of corrosion. For many traditional products, however, corrosion continues to be a serious destructive problem. In addition to traditional products, new developments in energy sources, advances in material sciences, microprocessing technology and miniaturization of new devices to the micron scale all reassert the demands for effective anticorrosion technologies that avert device failures.

Corrosion is typically understood as an electrochemical reaction that involves loss of electrons from metals, a reaction more generally described as oxidation. The definition of oxidation in electrochemical terms is independent of whether or not oxygen is present when the process of electron loss from a metal occurs. The loss of one or more electrons from a metal requires the acquisition of the electron(s) by another agent. Thus, the metal that serves as an electron donor in this case is termed a reducing agent, while the electron acceptor serves as an oxidizing agent.

One practical example illustrating such an electrochemical event typically involves metallic iron. Electrons lost from an iron atom (reducing agent) can be acquired by oxygen (oxidizing agent) to produce a new combined iron and oxygen derivative identified as iron oxide, or rust, which is an inorganic, low density (flaky) product commonly associated with metal corrosion. Although oxygen is used as a model of iron oxidation in this case, the same oxidizing agent effect could be demonstrated by sulfur and the resulting product could have been iron sulfide instead of iron oxide.

Apart from rust involving metal corrosion, the formation of scale presents another illustrative model tied to principles of oxidation. Scale is defined as a thin coating, layer or encrustation of material that is rich in complex oxides of sulfur, magnesium and/or calcium. These and other insoluble materials are typically developed and observed as mineral deposits on the inside diameters of pipes, chambers or containment vessels when water plus its dissolved constituents, or solutes, are heated in the process of making hot water.

The transfer of electrons between oxidizing agents and reducing agents cannot occur without the presence of an electrically conductive medium. Water typically serves as the electrically conductive universal solvent medium that supports metal oxidation, consequential corrosion and rusting as well as scale formation in the foregoing models.

Efforts to halt water-mediated metal oxidation and corrosion typically rely on superficial passivation of the metal with toxic materials such as chromic acid, sacrificial coatings (e.g., zinc or galvanized coatings), electroplated metals, polymeric coatings or related efforts that produce a protective barrier between the reactive metal surface and water. As another example, light oil treatments have also been used to protect metal surfaces.

Implementation of such strategies usually produces an inflexible anti-corrosion barrier on metal surfaces, and once applied, its removal may be difficult or impossible. In addition, the removal of such coatings can generate potentially hazardous waste materials. For those situations where micro-mechanical or circuit-based devices display corrosion tendencies, aggressive industrial anti-corrosion methods may be totally unsuitable and physically damaging. Thus, there is a significant need for new, simple-to-execute anti-corrosion barrier possibilities.

BRIEF SUMMARY OF THE INVENTION

The invention described herein is directed to preventing the oxidative corrosion of metal surfaces. In the invention, a metal surface to be protected is exposed to an anti-corrosion agent characterized as a lower alkyl carboxylic acid, an alkali salt, or other derivative thereof, that conserve or embody the lower alkyl carboxylic acid-type moiety present in their molecular structures.

Advantageously the anti-corrosive agent (ACA) selected for use in the invention is designated as having food-grade GRAS (generally recognized as safe)-status under U.S. Food and Drug Administration guidelines; or (2) an acceptable safety status under the aegis of the United States Pharmacopeia (USP)/National Formulary (NF) guidelines for human exposure. The ACA is therefore safe for use in food and beverages, and other ingestible products, as well as in products associated with foods and beverages. Such agents are suitable for use by and on humans and animals. One such ingestible ACA is sodium propionate.

The ACA can be used alone or in combination with other compounds, including other anti-corrosion agents as known in the art. Advantageously, when present, other such agents, including any additional anti-corrosion agents, are also ingestible. Particularly useful ingestible anti-corrosion agents include 2,4-hexadienoic acid and alkali salts and/or other derivatives thereof. Another useful compound for use in combination with the ACA of the invention is benzoic acid and alkali salts and/or other derivatives thereof. In yet another aspect of the invention, the ACA of the invention can be used in combination with an inorganic acid, which also is preferably ingestible.

The ACA can also be used in combination with a material, as hereinafter defined, capable of forming a moisture retentive barrier on the surface of the metal. In certain applications, the anti-corrosion agent alone is sufficient to achieve the desired anti-corrosive effect.

The material capable of forming a moisture retentive barrier film over a surface of the metal is selected from the group consisting of a polar liquid, a non-polar liquid, a viscous material, an organic liquid, a polymeric material and a petroleum-based substance, as well as combinations thereof. The composition of the invention can further include any one of a polar liquid, a non-polar liquid, a surfactant, an antioxidant, an organic liquid, a polymeric material, a petroleum-based substance, a buffering material, or graphite or particulate carbon in a suspension, or combinations thereof.

The anti-corrosion agent in the composition of the invention may be packaged for delayed release, e.g., by encapsulation. Advantageously, the anti-corrosion agent is present in the composition at a concentration of about 0.2 to about 60 percent by weight, although lower or greater concentrations can be useful so long as the resultant composition provides the desired anti-corrosion benefits. In a particularly useful embodiment, the composition is first prepared in concentrated form and then diluted prior to use.

Although not wishing to be bound by any theory or explanation of the invention, it is currently believed that the anti-corrosion agent spontaneously adsorbs or chelates to metal surfaces from water solutions so as to produce an organometallic barrier coating. In addition, the residual anti-corrosion agent, after having had an opportunity to adsorb to the metal surface, can remain as an aqueous solution where it effectively alters the normal dielectric properties of available water that could contribute to the water's ordinary corrosion properties.

The compositions and methods of the invention provide a practical, non-toxic way of ensuring anti-corrosion protection for metals, or devices containing exposed metals, stored or operated in water or in the presence of water vapor. Exemplary, non-inclusive uses include employing the composition as a lubricant for the surface of a metal or as a pump oil or brake fluid; using the composition as an undercoating for painting, electro-plating or electro-polishing procedures; and providing a protective coating for any metal or metal-containing machine or device, from automotive assembly plant metal press machines to electronic circuit boards.

The present invention also provides methods of preparing food and/or beverage preservatives. In this embodiment of the invention, an ingestible anti-corrosion agent, such as an ingestible lower alkyl carboxylic acid moiety, is combined with a suitable food grade polymer. The anti-corrosion agent and polymer are admixed in a particular order to maximize the preservative properties thereof.

DETAILED DESCRIPTION OF THE INVENTION

The present inventions now will be described more fully hereinafter, but not all embodiments of the invention are shown. Indeed, these inventions may be embodied in many different forms and should not be construed as limited to the embodiments set forth herein; rather, these embodiments are provided so that this disclosure will satisfy applicable legal requirements.

The present invention is directed to the use of lower alkyl carboxylic acids and salts or other derivatives thereof that structurally conserve or embody the characteristic lower alkyl carboxylic acid moiety as an active anti-corrosion agent (ACA). The lower alkyl carboxylic acid moiety can be represented as R—COO$^-$, in which R is hydrogen or C1-C6 alkyl.

The invention disclosed here provides a practical, non-toxic method that ensures anti-corrosion protection for metals, or devices containing exposed metals, stored or operated in water or in the presence of water vapor. The compositions that include the lower alkyl carboxylic acid moiety can inhibit the corrosion of metals for indefinite periods of time in a variety of venues as hereinafter described, e.g., while the metals remain immersed in an ACA solution, following coating with ACA in combination with other viscous agents or otherwise jacketed in ACA by a moisture retentive barrier.

The lower alkyl carboxylic acid moiety can be derived from a C1-C6 carboxylic acid, or from a salt or other derivative thereof. Exemplary lower alkyl carboxylic acids useful in the invention include without limitation formic acid, acetic acid, propionic acid, butyric acid, 2-methyl propionic acid, and the like, as well as mixtures thereof. Exemplary lower alkyl carboxylate salts useful in the invention include without limitation formate, acetate, propionate, butyrate, and 2-methyl propionate, as well as mixtures thereof. Mixtures of one or more lower alkyl carboxylic acids with one or more salts and/or other derivatives thereof may also be useful in the practice of the present invention.

When present as a salt, the cation of the lower alkyl carboxylate salt may be selected from a wide variety of mono- and di-valent cations. Advantageously, the cation is selected from alkali metal or alkaline earth metal cations. A particularly advantageous cation for use in the present invention is sodium.

One exemplary lower alkyl carboxylate useful in the invention is sodium propionate. Sodium propionate, as the sodium salt of propionic acid, dissociates in water to give the lower alkyl carboxylate anion plus a stoichiometrically molar equivalent concentration of sodium ions. The anion provided by the dissociation of sodium propionate in water is equivalent in structure and function to the anion produced upon the ionization of propionic acid in water according to principles of weak acid behavior as dictated by its ionization constant ($K_{eq}$).

The ACA can be used alone or in combination with other compounds, including other anti-corrosion agents as known in the art. Advantageously, when present, other such agents, including any additional anti-corrosion agents, are ingestible. Particularly useful ingestible anti-corrosion agents include compounds that conserve or embody a 2,4-trans, trans-hexadiene moiety in their molecular structure. Such compounds include 2,4-trans, trans-hexadienoic acid and alkali salts and/or other derivatives thereof, such as the alkali salt potassium sorbate. These anti-corrosion agents are described in published PCT Application WO 02/42523, published 30 May 2002, the entire disclosure of which is incorporated by reference.

Other compounds useful in combination with the ACA of the invention include acids and/or salts or other derivatives thereof that are capable of increasing the solubility of the ACA in water. The compound capable of increasing the solubility of the ACA in water is also advantageously ingestible, as defined above. One non-limiting example of such a compound is benzoic acid and its alkali salts and/or other derivatives thereof. Particularly useful are alkali salts of benzoic acid, such as sodium benzoate. Sodium benzoate has the added benefit of also meeting the ingestible standard discussed herein. Although not wishing to be limited by any theory of the invention, sodium benzoate is currently believed to assist in increasing the solubility of the ACA in aqueous environments, thereby allowing the use of increased amounts of the ACA. Such solubility increasing compounds are not limited to sodium benzoate, however, so long as the additive also functions to increase ACA solubility in aqueous solutions, as compared to the solubility of the ACA in the same environment but without the added compound.

Additional compounds useful in combination with the ACA of the invention include any of the food additives permitted for use in connection with food and/or beverages for human and/or animal consumption in accordance with U.S. FDA guidelines. The additional compounds include without limitation the agents listed at 21 CFR Sections 172, 173, 181, 182, 184, 573, and 582, as well as mixtures thereof. The disclosures of 21 CFR 172, 173, 181, 182, 184, 573, and 582 are hereby incorporated by reference in their entirety. Such food additives can be used in amounts known in the art.

Exemplary food additives include without limitation food grade polymers, including celluloses and derivatized celluloses, adhesives, coatings, and films; acid compounds; antimicrobial agents; antioxidants; antimycotics; food preservatives; dietary and nutritional additives; anticaking agents; and the like, as well as mixtures thereof. The ingestible acid compounds include inorganic and organic acids, including aliphatic and aromatic, saturated and unsaturated, carboxylic acids, fatty acids, amino acids, and the like. Derivatives of such acids are also useful, including, without limitation, alkali metal salts, alkaline earth metal salts, transition metal salts, ammonium salts, and esters of the acids.

The ACA advantageously is used in combination with a material, as hereinafter defined, chosen, e.g., for its low dielectric constant (D-value) and/or for its lubrication properties and capable of forming a moisture retentive barrier to provide anti-corrosion protection for metal surfaces. In certain applications, e.g., if the protected metal object remains immersed in an ACA solution, the anti-corrosion agent alone is sufficient to achieve the desired anti-corrosive effect. However, the anti-corrosion agent can also be used in combination with a material capable of forming a moisture retentive barrier on the surface of the article to be protected. This composition not only achieves superior results during immersion but also permits the protected article to be dried and to still retain long term anti-corrosion protection.

Although the method of the invention may be implemented by dissolving sodium propionate in water as an expeditious route for providing the ACA activity, the functional ACA activity is due to the lower alkyl carboxylic acid anion. Thus, any substance that directly or indirectly yields this functional anion or provides for its time-released potential availability to any system that contains or might acquire water is considered to be a functional lower alkyl carboxylic acid moiety of the invention and will have equivalent anti-corrosion consequences. This includes the possible embodiment of the anion or its equivalent as (1) a covalently bonded moiety to any other single molecule; (2) a hydrolyzable acyl-ester of mono- or polyhydroxy alcohols as well as aldose and ketose sugars their monosaccharidic acid equivalents and their polymers; (3) a hydrolyzable acyl-ester of a synthetic polymer or (4) as a hydrolyzable or nonhydrolyzable substituent of simple, complex or derived lipids. Structural modifications of the lower alkyl carboxylic acid where the carboxyl group ($-COOH$) is substituted or replaced by any other acidic groups, such as ($-SO_3H_2$) or ($-PO_3H_2$) but not to the exclusion of others, are also considered under the functional aegis of a lower alkyl carboxylic acid anion.

In addition to the use of a separate moisture retentive barrier, the lower alkyl carboxylic acid moiety-metal surface interaction can be ensured by incorporating the ACA into coatings such as those modeled by high viscosity water-soluble non-ionic barrier coatings applied by immersion (dipping) or spraying. While ensuring ACA contact and effectiveness over the surface of a metal, such barriers can be effectively removed by water when necessary, the unoxidized and uncorroded metal surface may be dried, and then further processed as desired. In other applications, for example, direct current may be applied surrounding the ACA-coated metal to produce a directed walk of the ACA away from the metal thereby leaving its surface relatively unprotected to corrosion.

A metal surface coated with an anti-corrosive barrier according to the invention is an excellent candidate for further coating, e.g., by painting or plating over, using fewer steps than are required with prior art processes. In addition, less of the coating/plating material is required than with prior art methods to achieve a stronger, longer lasting barrier finish with no oxidation. Furthermore, the coating material is less brittle when applied over an undercoating according to the invention. The composition of the invention may also be mixed into, e.g., a paint or epoxy material, which is then applied as desired, and the resulting coating is more pliable.

In place of water, solvents compatible with the dissolution of either or both the ACA or the chemically unrelated barrier coating can be used to rinse the substances from a treated metal surface. Such solvents could include organics, organic-water combinations with or without pH adjusted and ionic strength regulated buffer solutions.

Although not wishing to be bound by any explanation of the present invention, it is currently believed that the metal anti-corrosion protection mechanism for the lower alkyl carboxylic acid moiety involves two uniquely independent effects that collaterally support the anti-corrosion phenomenon. First, the ACA is believed to spontaneously adsorb or chelate to metal surfaces from water solutions so as to produce an organometallic barrier. Second, the residual ACA in solution, after having had an opportunity to adsorb to the metal surface, is believed to remain as an aqueous solution where it effectively alters the normal dielectric properties of available water that could contribute to its ordinary corrosion properties. The molecular nature of the ACA is believed to be inherently responsible for these two effects, and neither of these effects can be made separable from the other as long as the molecule remains intact.

The lower alkyl carboxylic acid moiety thus separates the metal surface from the water and blocks its contact with substances in solution that will promote surface metal oxidation and ensure evidence of corrosion. Compounds ordinarily implicated in corrosive mechanisms involve Group VIA elements of the Periodic Table, but not to the exclusion of others. Metal oxidation and corrosion rely on water-mediated electron transport plus oxidizing and reducing agent interactions. In the method of the invention, the required participation of water for electron transport does not occur. Accordingly, electron transfers mediated by water between materials with galvanically driven electrochemical potential differences can also be minimized.

Water effectively mediates electron flow between oxidizing and reducing agent (redox) pairs because it demonstrates a naturally occurring high dielectric constant (D) of 78.5. While not-being bound by any theory, it appears that the demonstrated dielectric property of water is so affected by addition of the anti-corrosion agent of the invention that electrical devices protected according to the method of the invention can continue to be operated by alternating currents while the circuitry is immersed in water. Whether such a demonstration of lowered conductivity is applied to allowing a light bulb to luminesce with 110 volt alternating current supplied by uninsulated copper wires under water, or to reducing the electrochemical flux of electrons accountable for metal corrosion, the performance of the anti-corrosion agent of the invention is clear, defined and repeatable.

The decisive establishment of minimal effective ACA solution concentrations that will protect metals from surface corrosion is a common consideration. Although solutions of the ACA up to about 60 percent by weight in water may allow indefinite metal resistance to oxidation and corrosion, much lower concentrations can be used in practice of the invention. Not being bound by any theory, the minimal effective concentration of the ACA that is necessary to protect a specific metal surface from corrosion can be determined by:

1) Whatever concentration of the ACA adequately produces an organometallic surface barrier over the metal; or
2) How much residual ACA must remain in solution to ensure that a zero electrical potential exists between the adsorbed organometallic barrier over the metal surface, as well as the molecular organometallic barrier and the surrounding aqueous phase.

Depending on the ionic strength ($\mu$) or ion concentration (s) in the surrounding water, including divalent and trivalent metal cations, and the unique electrochemical potential over the surface of a metal, effective ACA concentrations can be customized to meet anti-corrosion performance demands. ACA concentrations in water may range, e.g., from about 0.2 to about 60 percent by weight depending on where a zero electrochemical potential effect is met between the metal surface and the potentially conductive liquid phase.

Various techniques as known in the art can be used to determine the adequacy and sufficiency of ACA concentrations that will effectively control metal oxidation and corrosion. As an example, a discretionary test matrix of up to 30 aqueous solutions can be prepared, each of which is formulated to produce a solution documented in terms of its specific conductivity (measured in microsiemens ($\mu S$)). Where necessary, elementally pedigreed metals designed for anti-corrosion protection are immersed as test specimens in the respective solutions of known specific conductivity. Following two to four weeks of immersion using a desired metal contact temperature, the pedigreed metal samples can be examined for evidence of corrosion using microscopic methods or energy dispersive X-ray analysis. Reference is also made to ASTM B117, which can also be used to determine the adequacy and sufficiency of the ACA concentrations effective for controlling metal oxidation and corrosion.

In the case of energy dispersive X-ray analysis, elemental evidence of oxygen reaction with the surface of the metal is indicative of insufficient ACA effectiveness. Based on the graduated specific conductivity test matrix, some level of specific conductivity will be obvious as a key point above which metal corrosion does not occur. Furthermore, this conductivity will correspond to some minimally effective concentration of a lower alkyl carboxylic acid moiety-based solution that exerts a similar anti-corrosion effect.

The use of any additional ACA concentration beyond that which produces anti-corrosion effects serves only to ensure the functional longevity of the ACA in solution. Once a metal surface, e.g., iron or aluminum, interacts with the ACA, a level of anti-corrosion protection against water vapor and humidity driven corrosion effects is demonstrated. As a non-limiting example, ferrous metal fibers incorporated into an aqueous plaster-of-Paris formulation (POPF) readily undergo corrosion and rusting during the course of plaster hardening and curing. The use of the aqueous ACA formulation in an identical aqueous plaster formulation, however, can halt iron fiber corrosion, rusting and evidence of iron oxide migration through the cured plaster product. The effect of the ACA on the metal fibers can persist as a protective anti-corrosion barrier over the iron fibers long after the plaster has cured. Whereas the dry, cured, fiber impregnated plaster without ACA use can show signs of continued corrosion at relative humidities up to 90 percent, the ACA treated fibers can remain shiny and free of rust. This can further demonstrate that the ACA appears to work in conjunction with other agents, e.g., in this case, the binding and adhesive agents in the plaster, to form a protective film that may now be dried.

As discussed above, other anti-corrosion and/or solubility modifying agents can also be used in conjunction with the lower alkyl carboxylic acid moiety. Such additional agents include 2,4-trans, trans-hexadienoic acid and/or salts thereof; benzoic acid and/or derivatives thereof; and/or combinations thereof. The amount of additional agent(s) can vary, depending upon various factors such as noted above, as well as the concentration the lower alkyl carboxylic acid moiety of this invention, the demands of a particular application, and the like. Generally the additional agent(s) is present in an amount sufficient so that the combination thereof with the lower alkyl carboxylic acid moiety anti-corrosion agent provides the desired level of corrosion resistance to the treated surface, as determined using the tests defined herein.

The additional anti-corrosive and/or solubility modifying agents can also be used to tailor the pH of a composition that includes the lower alkyl carboxylic acid moiety. In this regard, the additional agent can be added in an amount sufficient to impart a pH from about 2 to about 13 to the composition of the invention. The pH of a given composition can vary depending upon the particular use therefore (e.g., rust removal, rust inhibition, etc.). The pH can also be tailored to match the needs of a particular environment in which the composition is used. For example, the additional agent(s) can be added in an amount sufficient to lower the pH of a composition for use in applications requiring a more acidic composition. Conversely the added agents can be present in an amount sufficient to provide a pH suitable for applications requiring a more basic composition.

Owing to cost and availability, water is the preferred polar solvent medium for preparing the composition of the invention, when the composition includes those moisture retentive barrier materials miscible with water. Purified, distilled, deionized water at 0.1 $\mu S$ or tap water can function equally well as aqueous solvents depending on the anti-corrosion applications. The ACA may also be admixed, colloidally suspended, or homogenized to a size of less than or equal to 2 microns in liquids that may or may not already contain some water but that also display dielectric properties (D-values) substantially lower than that of water alone.

Furthermore, colloid milling or homogenization of the ACA into selected low dielectric solvents will permit formulation of soluble, emulsifiable or colloidal concentrates that can be diluted on demand to meet protective metal anti-corrosion requirements. These products have the consistency of greases or petroleum jelly. Similar embodiments of the ACA can be incorporated within fluids that are designed and engineered to have predictable shear rates and shear stresses. These include non-Newtonian fluids that have Bingham plastic, pseudoplastic, dilatant, thixotropic and rheopexic flow properties as well as systems that exhibit Newtonian behavior.

Alternatively, the ACA may be colloidally stabilized or homogenized, with or without the assistance of surfactants or suspendable solids, into nonpolar liquids such as oils or nonpolar esters of any desirable melting point or description that display high or low D-values. Applications for such an embodiment of the invention are designed to counter the water mediated corrosive oxidation effects incumbent with fugitive water droplets, condensation or contamination in oils, which mediate the oxidative destruction of engineered metal surfaces. Typical among these applications are those where dielectric transformer or pump oils may be used. The natural water solubility of the ACA ensures that any fugitive water in oils, designed and used for their low D-values and/or lubrication will be preempted from having their operative D-values and lubrication properties altered by an unavoidable acquisitions of water.

As indicated, water may serve as a singular solvent to demonstrate the favorable anti-corrosion effect of lower alkyl carboxylic acid moieties on metal surfaces, but a variety of water miscible organic solvents with D-values less than that of water can also be useful in augmenting ACA performance. These solvents include primary, secondary and tertiary alcohols, diols, glycols, glycerols, triglycerol ethers, oxygen-based esters, ceramides, sphingolipids, petroleum by-products, alkaline salts of other fatty acids or glycerol-phospholipids (e.g., lecithin).

In other cases, the ACA may be encapsulated within liposomes, gels, dextrins or dextrans including cyclodextrins for protracted delivery purposes as the effective ACA is needed. For example, in one preferred model embodiment, dry porous spherical dextran beads can be independently saturated with the lower alkyl carboxylic acid moiety. Such embodiments of the ACA will provide time release or release on demand anti-corrosion protection to high dielectric fluids as water is accrued by the fluid and water-mediated corrosion of surrounding metal surfaces would ordinarily be promoted.

In another particularly preferred embodiment, a powdered form of the ACA may be admixed with a powdered form of any moisture retentive barrier coating material as described herein for use in powder metallurgy processes for coating metals, which are well known to those of ordinary skill in the art. Such processes provide the anti-corrosive coating properties according to the invention for use, e.g., in the automotive, aerospace and tool industries without the necessity of handling large volumes of liquids.

For some desired applications of the ACA, the invention can be implemented in a solution where, e.g., less than 20 percent by weight of the liquid phase is contributed by water, and the balance of the volume is contributed by low dielectric and water miscible solvents. Such water miscible organic embodiments of the ACA may support non-corrosive storage of finely engineered medical instruments or other fine mechanical devices where the desirable antimicrobial effects of alcohol(s), for example, dovetail with the beneficial anti-corrosive effects of the ACA. Similar embodiments of the ACA with low water content and water miscible organic solvents also provide a fluid-platform basis, with or without other adjuvants, for controlling metal oxidation.

A chief design and application criterion for implementing the method of the invention is based on the fact that metals, and particularly ferrous metals, are best protected from the perils of oxidation in a dessicated inert gas atmosphere. However, these are unrealistic conditions. Thus, the composition and method of the invention can permit a practical extension of this protection by augmenting the ACA performance properties with polymers and other viscous systems.

One advantageous and widely applicable embodiment of the invention centers upon using an aqueous ACA solution according to the invention as a solvent for the admixture of polymers that impart predictably-graded degrees of (1) density, (2) molecular weight distribution, (3) viscosity, (4) hygroscopicity, (5) surface tension and (6) lubricity. Such polymers may be purely synthetic, or natural, or mixtures of natural and synthetic polymers, or represent any degree of mixed polar and non-polar properties that meet some use demand. However, incorporated together, such polymers have no innate anti-corrosion capabilities of their own. It is obvious, too, that all six of the properties cited are common performance criteria for petroleum products and as in cases of water soluble polymers, petroleum-based substances can also be specifically varied in their compositional properties to meet certain use demands. Such adaptability to specific overlapping use applications shared by both water-soluble polymers and petroleum product could occur in many areas but the corrosion issue tied to water-based systems is often satisfactory for making decisive application choices. Although lubricity and viscosity properties of petroleum products can effectively shield ferrous metals from some corrosive reactions, petroleum products are not anti-corrosion agents. Indeed, many petroleum products that temporally shield metals from rusting and oxidation undergo oxidation themselves, which obviates their anti-corrosion protection. The invention permits the admixture of a genuine anti-corrosion agent according to the invention into any fluid or viscous system with or without the contribution of any polymers to inhibit metal oxidation, including that of ferrous metals and aluminum.

Chief among favored water soluble polymers that can embody the invention are those polymers such as polyethylene glycol (PEG), methoxypolyethylene glycol (MPEG), and polyalkylene glycol (PAG) (also described as a linear polymer of propylene and ethylene oxides). The general formula for PEG is $H—[O—CH_2—CH_2]_n—OH$ and the corresponding designation for MPEG is $CH_3—[O—CH_2—CH_2]_n—OH$. For PAGs or the linear copolymers of ethylene and propylene oxides, the general formula corresponds to $X—O—[CH_2—CH(CH_3)—O]_n[CH_2—CH_2O]_m—Z'$ where subscripts "n" and "m" are average numbers of different repeating bracketed monomers, namely, "propylene oxide" and "ethylene oxide," "X" is a hydrogen atom (—H) or any other relevant nondescript functional group and "Z'" is a hydrogen atom (—H) or hydroxyl (—OH) group. Average molecular weights for PEGs, MPEGs and PAGs are less than 100,000 with many in the usual range of less than 15,000. Other favored embodiments of the invention can include addition of the ACA to nonionic, water-soluble poly(ethylene oxide) polymers characterized by high molecular weight ranges from 75,000 to 12,000,000 daltons.

The low concentration level of the lower alkyl carboxylic acid moiety necessary to impart the anti-corrosion effect of the invention to water permits a wide variation in the use and composition of any water-inclusive polymer systems. Thus, water-based polymers according to the invention can have high or low polymer concentrations, high or low amounts of water, with or without hydrophobic components that allow wide ranging lubricity, miscibility, viscosity, solvency, boiling point, flash point, freezing point and in some cases elastomer compatabilities that remain unaffected by the anticorrosive's presence. These considerations afford possibilities for a variety of low toxicity petroleum analogue products that are water-based and non-corrosive to ferrous and many non-ferrous based metals. The low toxicity of various glycols that already have (1) food-grade GRAS (generally recognized as safe)-status under U.S. Food and Drug Administration guidelines; or, (2) an acceptable safety status under the aegis of the United States Pharmacopeia (USP)/National Formulary (NF) guidelines for human exposure can now assume new unanticipated application uses with a GRAS-sanctioned and food-grade adjuvant such as sodium propionate. Whether or not some or all of these components are food-grade, GRAS or USP/NF sanctioned does not affect the performance of the anti-corrosion effects demonstrated by the invention.

Another preferred embodiment of the invention centers upon admixture of the ACA to homogenous or heterogenous polymers of amino acids including their peptide structures having molecular weights less than 5,000 daltons or unqualified protein structures greater than 5,000 daltons that are synthetically manufactured, biologically produced or genetically engineered by any route. By practical extension, use of the ACA can also be in conjunction with homo- or heteroglycan polymers of any description obtained and crafted by any route. These include ACA addition to hydrocolloidal (1) anionic seaweed polysaccharides such as agar, alginic acid polymers and carrageenan; (2) anionic exudate polysaccharides including arabic, ghatti, karaya and tragacanth gums; (3) non-ionic seed polysaccharides such as guar, locust bean and tamarind; (4) microbiologically or in vitro enzymatically synthesized polyglucans with or without proteins including but not limited to xanthan gum, cranberry extract and other extracts; and (5) any modified carbohydrate polymers such as derivatized celluloses including without limitation hydroxyalkylated, carboxyalkylated, and/or alkylated starches or celluloses. Non-limiting examples include hydroxyethyl cellulose, hydroxypropyl cellulose, carboxymethylcellulose, methyl cellulose, ethyl cellulose, methyl ethyl cellulose, and the like, as well as mixtures thereof. These embodiments are cited merely as examples and do not limit the intent and spirit of the invention applied to any numbers of polymeric substances that can benefit in use from the invention. Regardless of their USP/NF, GRAS or food-grade status, the performance of the ACA remains consistent and unaffected. Reference is also made to 21 CFR Sections 172, 173, 181, 182, 184, 573, and 582, discussed above, for other exemplary food grade polymers useful in the present invention.

The operational principles of the invention can also be demonstrated in preferred embodiments where graphite or particulated carbon suspensions exist with the food-grade ACA so as to afford a lubricating suspension with anti-corrosion properties. The liquid fraction of the suspension can contain hydrophilic or hydrophobic components as well as various mixtures of any other adjuvants that effect the functionality of the suspension.

This embodiment does not discount the use of other adjuvants that optimize the application of the invention's concepts such as the addition of antioxidants, chelation agents, surfactants, silica and silicone oils.

Additional concerns regarding issues of environmental waste, persistence and industrial hygiene also challenge the long-term safety and routine clean-up procedures tied to the use of petroleum products. Based on these factors, water-based anti-corrosion formulations of the lower alkyl carboxylic acid moiety combined with glycerol, diols, polyethylene glycols as well as water emulsified and stabilized vegetable oils (i.e., water-in-oil emulsions) can offer many advantages of petroleum products. Some of these may or may not require surfactant uses. Typical application venues for such aqueous-based, non-hydrocarbon, but petroleum-like formulations include: lubricants for metalworking, cutting oils, food machinery, grease compositions, metal part protectants (nuts, bolts, etc.), hydraulic fluids, compressor and vacuum pump oils; humectants, iron sequesterants and whiteners in paper processing; metal corrosion inhibition over food processing surfaces; toiletry formulations including adjuncts to shaving cream that ensure anti-corrosion and sharpness on metal blades and cutting edges; nonconductive alternating current transformer fluids and coolants; and many other areas.

Furthermore, the inseparable functional ability of the ACA to modulate the dielectric constant of water is no less important. This property allows further unexpected applications for the possible control of the specific conductivity of water as it relates to minimizing electrochemically-based metal corrosion over existing metal barrier-coatings or passivated metal surfaces; decreasing oxidative reactions between metal surfaces and biofilms; or reducing electrochemically incited adsorption between organic molecules and electrically charged solids in aqueous systems.

The low acute toxicity, non-carcinogenicity and non-teratogenic properties of the ACA disclosed here support its use as a favorable adjunct to reduce the toxicity and environmental persistence of existing less environmentally favorable ACAs. In other cases, the ACA may be selectively formulated with biocides, e.g., antioxidants, surfactants or chelators, to suit any level of microbiological challenge. Beyond this,-as sodium propionate is a GRAS, food-grade substance, human exposure at any stage of the life-cycle does not present any known deleterious threat or serious consequence to human health at practical use levels.

The compositions according to the invention can prevent the corrosion of various ferrous samples, for example, various types of stainless steel, various types of low carbon steel, as well as cast iron, aluminum and other metals.

Thus, the compositions of the invention provide a superior level of corrosion protection and are, simultaneously, water based, non-toxic and easily removed from the surface of a component for subsequent processing. Other coating systems, such as enamel paints, hard metallic coatings and heavy plastic coatings, require stripping for any subsequent processing and generate a hazardous waste product. The coating system according to the invention not only provides similar protection but also can be easily removed for subsequent processing without generating a hazardous waste.

The only comparable coating systems that are on the market today involve light oil treatments. These are generally put on steel bat and steel sheet products and then covered with paper or other laminates, which hold the oil in place. Most of these coatings do not fully protect the surface from corrosion, and, eventually, pitting and general surface corrosion occur. The light oil coating also has to be completely removed before subsequent processing, which requires the use of solvents and other cleaning chemicals. Additionally, as the light oil does not completely prevent corrosion, components generally have to be surface treated by grinding, machining or further chemical treatment. Besides the additional costs required to clean off the protective coating and treat the steel product, more hazardous wastes products are generated. A clear advantage of the corrosion protecting system of the invention is that it is completely removable by water rinsing and that the surface of a treated piece from which the coating has been removed can be further processed without surface treatment or machining.

Other applications of the novel coating systems include gun lubricants, machining lubricants, and the protection of steel and ferrous products during shipment, particularly transoceanic transport, where products are exposed to salt water and high temperatures.

The inventive coating systems have a substantial advantage in these applications. Further potential application of the coating system would be for steel products in the automotive industry, which is currently using galvanized steel. The corrosion protection system of the invention could practically eliminate the use of zinc coated steels for corrosion protection in automotive applications.

The various potential applications of the corrosion protection system of the invention might be categorized as follows.

(1) Complete Immersion Corrosion Protection—These applications would involve protection against corrosion and organic build up in closed loop water based systems such as water cooling, heat exchangers and boilers. Ferrous, brass and aluminum based metals would benefit from the use of this product as the base for the liquid heat transport system. These applications range from automotive radiators to cooling water for nuclear reactors.

(2) Dip & Ship Applications—These applications involve the use of the corrosion protection system to prevent the corrosion of ferrous products during shipment.

(3) Lubrication—The system of the invention also lends itself to lubrication applications with the added benefit of not only providing corrosion protection but also being non-toxic. Potential applications include, e.g., food machinery and firearms lubricants and fluids for machining applications. Other applications might include any cutting operating that requires lubrication, ranging from the use of industrial blades to razor blades.

(4) Permanent Metal Coatings—The corrosion protection system according to the invention can be used as an undercoating, e.g., as a plating or a paint base, to provide substantial long term protection in the harshest environments. Applications include use with automotive paints, electronic and computer component coatings and marine coatings. The coating can be applied as a liquid coating or by powder metallurgy processing.

Other more specific areas of use include wood processing, for termite control or reduction of brown mold; agricultural products, e.g., mixing a composition according to the inven0tion with animal feeds, for mold prevention and odor reduction; medical and pharmaceutical, for rust inhibiting antiseptics; manufacturing of plastics, e.g., mixing a composition according to the invention into the premolded plastic to prevent oxidative degradation, and paper manufacturing, e.g., for paper whitening and for mold prevention and odor reduction.

In yet another aspect of the invention, the ACA of the invention is used in combination with an additional acid compound, which is different from the ACA, to pretreat a metal surface prior to applying a coating thereto. The additional acid compound can be selected to modify the pH of an aqueous solution of the ACA. The additional acid compounds can be ingestible, and can include inorganic and organic acids, including aliphatic and aromatic, saturated and unsaturated, carboxylic acids, fatty acids, amino acids, and the like. Derivatives of such acids are also useful, including, without limitation, alkali metal salts, alkaline earth metal salts, transition metal salts, ammonium salts, and esters thereof. Reference is again made to 21 CFR Sections 172, 173, 181, 182, 184, 573, and 582 for a non-limiting listing of ingestible acids useful in this aspect of the invention. Particularly useful are ingestible phosphoric acid and ingestible citric acids, as well as mixtures and derivatives thereof.

In this embodiment of the invention, the lower alkyl carboxylic acid moiety and the additional acid compound, such as phosphoric acid, are applied to a metal surface to pretreat the same. This pretreatment can prevent corrosion of the metal surface upon exposure to Water. In addition to the desired anti-corrosion benefits, a metal surface pretreated with the lower alkyl carboxylic acid moiety and additional acid compound can also exhibit improved bonding to a subsequently applied coating, e.g., plating, paint, and the like. The subsequent coating can be applied using techniques known in the art, such as liquid coating, powder coating, or other coating techniques. Although not wishing to be bound by any theory of the invention, it is currently believed that the lower alkyl carboxylic acid moiety and/or the additional acid compound react with the metal surface so as to provide a modified surface that is more receptive to an added coating than the untreated metal surface.

The lower alkyl carboxylic acid moiety and additional acid compound can be dissolved in a suitable solvent, such as water, and the resultant solution is applied to the metal surface by dipping, spraying or the like. The amount of lower alkyl carboxylic acid and additional acid compound present in the solution can vary. The concentration of each is selected to provide sufficient corrosion protection, as discussed above. As an example, the lower alkyl carboxylic acid moiety can be present in an amount of about 0.2 to about 60 weight percent, based on the total weight of the solution. The additional acid compound can be present in an amount sufficient to provide a final solution pH ranging from about 2 to about 13, preferably from about 3 to 10, and more preferably from about 4 to about 9. One non-limiting example is an aqueous composition including about 1 weight percent phosphoric acid and about 5 weight percent sodium propionate, the solution having a pH of about 5.5.

Additional non-limiting examples of ingestible acid compounds useful in this aspect of the invention in combination with the ACA include: folic acid (folacin); fumaric acid; polymaleic acid; glutamic acid; hydrochloric acid; thiodipropionic acid; aconitic acid; alginic acid; caprylic acid; stearic acid; tannic acid; ammonium citrate; calcium citrate; ferric citrate; isopropyl citrate; manganese citrate; potassium citrate; sodium citrate; stearyl citrate; adipic acid; citric acid; hydrochloric acid; lactic acid; malic acid; phosphoric acid; potassium acid tartrate; sodium acid pyrophosphate; succinic acid; sulfuric acid; tartaric acid; ascorbic acid; erythorbic acid; sorbic acid; thiodipropionic acid; aspartic acid; aminoacetic acid; linoleic acid; tartaric acid; formic acid; and the like, as well as derivatives and mixtures thereof.

The present invention also provides methods of preparing food and/or beverage preservatives. In this embodiment of the invention, an ingestible anti-corrosion agent, such as the lower alkyl carboxylic acid moiety described herein, is combined with a suitable food grade polymer. Food grade polymers are well known in the art and include without limitation cellulose and cellulose derivatives as well as the other polymers described above. Reference is also made again to 21 CFR Sections 172, 173, 181, 182, 184, 573, and 582.

Other ingestible anti-corrosion agents can also be used, singly or in combination, in this aspect of the invention. Other useful anti-corrosion agents include without limitation 2,4-trans, trans-hexadienoic acid and its alkali salts, benzoic acid and its salts, and mixtures of these with one another and/or with a lower alkyl carboxylic acid moiety, Regardless of the ingestible anti-corrosion agent(s) used, the inventors have found that the order of addition of the compounds comprising the food preservative can impact the properties of the resultant composition. In this regard, a food grade polymer, such as cellulose and/or a derivative thereof as described above, is added to an aqueous solution under conditions sufficient to hydrate or saturate the polymer component. Other solvents can also be used, including, for example, ingestible primary, secondary and tertiary alcohols, diols, glycols, glycerols, and the like. One advantageous alcohol useful in this aspect of the invention is ethanol.

Hydration conditions can vary, depending upon the nature of the polymer, the amount of polymer used, and the like, and can be determined readily by the skilled artisan. As will be appreciated by the skilled artisan, the hydrated solution can be evaluated qualitatively by visual observation to determine if the polymer is substantially completely dissolved into solution. The amount of polymer added to solution can vary and generally ranges from about 0.01 up to about 20 weight percent, although amounts outside of this range may also be useful so long as the polymer is sufficiently dissolved in the solution. The skilled artisan will appreciate that the amount of polymer used can depend at least in part on the size of the polymer. The inventors have found that this aspect of the invention is useful with polymers ranging widely in size, as determined by variations in polymer chain length, molecular weight (as low as 200 up to 8000 or more), and viscosities.

Thereafter, the ingestible anti-corrosion agent is added to the hydrated polymer to form a preservation composition. The ingestible anti-corrosive agent is added to the hydrated polymer in an amount sufficient to allow formulation of a composition therefrom that exhibits preservative properties when used in connection with food and/or beverage products. In this regard, the desired preservative properties of the final composition as used with food and/or beverages can be determined using the Rose Bengeo test, recognized in the food industry for measuring anti-microbial properties of an agent. As little as 0.2 weight percent of the anti-corrosion agent, based on the weight of the composition as applied to the food and/or beverage product, can be effective as a mold inhibitor using this test as a measure. Higher amounts of the anti-corrosive agent, however, can also be effective.

Although not wishing to be bound by any explanation of the invention, it is currently believed that the hydrated polymer incorporates the anti-corrosion agent within its structure. Thus the amount of anti-corrosion agent added to the hydrated polymer can depend in part on the number of reactive sites available within the hydrated polymer molecule. Advantageously care is taken to avoid adding anti-corrosion agent in excess of the stoichiometric amount necessary for reaction with the hydrated polymer molecules. The resultant integrated structure can exhibit improved stability in solution, e.g., minimal or no precipitation of the integrated polymer/anti-corrosion molecule in solution, even under extreme temperature conditions (freezing and/or heating).

The anti-corrosive agent may be added to the hydrated polymer in many forms, including without limitation, as a powder or in concentrate form, e.g., as a composition that maximizes the amount of anti-corrosion agent present therein with minimal or no precipitation thereof. The amount of anti-corrosive agent present in the concentrate can vary based on conditions such as the specific anti-corrosion agent used, solvent(s), and the like. For example, the concentrate can include sodium propionate as the anti-corrosion agent in an amount ranging from about 20 to about 50 percent, and even approaching about 60 percent, by weight.

Thereafter the composition can be diluted with additional solvent, e.g., water, and used as desired. As noted above, a composition with as little as 0.2 percent by weight of the anti-corrosive agent can be effective as a mold inhibitor using the Rose Bengeo test. The invention allows use of significantly lower amounts of an active agent to achieve the desired preservative properties. In contrast, the food industry would typically require up to four times, or more, the amount of an active agent as compared to the amount useful in this invention to achieve the same level of food preservative properties.

In addition to its effectiveness as an anti-microbial agent, the food preservative composition in accordance with this aspect of the invention also imparts "organoleptic stability" to the food or beverage to which it is applied. This property refers to the stability of the food and/or beverage over time, and in particular to sensory attributes such as smell and taste exhibited by such foods/beverages over time as determined using known qualitative test standards. In this regard, the present food preservative in the form described herein can significantly extend the life of food and/or beverages (with regard to taste and smell) as compared to the same food and/or beverage without the preservative of the invention. The ability to significantly extend the life of food and beverages is unique to this composition, and such properties are not exhibited by other food preservatives, or even the active agents in these compositions, when used in a manner different from than that described herein.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for preventing oxidative corrosion of a metal, comprising:
   applying an anti-corrosion composition to a surface of a metal or a device containing a metal susceptible to oxidative corrosion, said composition comprising an amount of an anti-corrosion agent comprising a lower alkyl carboxylic acid moiety in the form of a lower alkyl carboxylic acid anion effective for forming an anti-corrosive barrier over said surface, and optionally further comprising a moisture retentive barrier forming material in an amount effective for forming a moisture retentive barrier over said surface.

2. The method of claim 1, wherein said material capable of forming a moisture retentive barrier over a surface of said metal is selected from the group consisting of a polar liquid, a nonpolar liquid, a viscous material, an organic liquid, a polymeric material and a petroleum-based substance, and mixtures thereof.

3. The method of claim 1, wherein said composition further comprises any one of a polar liquid, a non-polar liquid, a surfactant, an antioxidant, an organic liquid, a polymeric material, a petroleum-based substance, a buffering material, or graphite or particulate carbon in a suspension.

4. The method of claim 1, wherein in said composition, said anti-corrosion agent is present at a concentration from about 0.2 to about 60 percent by weight.

5. The method of claim 1, wherein said composition is first prepared in concentrated form and then diluted.

6. The method of claim 1, said method further comprising, following said applying step, the step of applying a further coating layer over said surface.

7. The method of claim 6, wherein said further coating layer is applied by a process selected from the group consisting of painting, electro-plating and electro-polishing.

8. The method of claim 1, wherein said applying step comprises using said composition as a lubricant for a surface of said metal.

9. The method of claim 1, wherein said applying step comprises using said composition as a pump oil or brake fluid.

10. The method of claim 1, wherein said anti-corrosion agent is ingestible by humans.

11. The method of claim 10, wherein said composition further comprises at least one additional anti-corrosive agent that is different from said lower alkyl carboxylic acid moiety and which is also ingestible by humans.

12. The method of claim 10, wherein said composition further comprises at least one compound capable of increasing the solubility of said ingestible anti-corrosion agent.

13. The method of claim 1, wherein said at least further comprising a 2,4-trans, trans-hexadiene moiety.

14. The method of claim 13, wherein said 2,4-trans, trans-hexadiene moiety is in the form of a 2,4-trans, trans-hexadienoic anion.

15. A method for preventing oxidative corrosion of a metal, comprising:
applying an anti-corrosion composition to a surface of a metal or a device containing a metal susceptible to oxidative corrosion, said composition comprising an amount of an anti-corrosion agent comprising a lower alkyl carboxylic acid moiety effective for forming an anti-corrosive barrier over said surface, and optionally further comprising a moisture retentive barrier forming material in an amount effective for forming a moisture retentive barrier over said surface, wherein said anti-corrosion agent and said material capable of forming a moisture retentive barrier over a surface of said metal are in powdered form.

16. The method of claim 15, wherein said anti-corrosion agent and said material capable of forming a moisture retentive barrier over a surface of said metal are both provided in powdered form to produce a powdered composition; and wherein said powdered composition is applied to a surface of said metal by powder metallurgy processing.

17. A method for preventing oxidative corrosion of a metal, comprising:
applying an anti-corrosion composition to a surface of a metal or a device containing a metal susceptible to oxidative corrosion, said composition comprising an amount of an anti-corrosion agent comprising a lower alkyl carboxylic acid moiety effective for forming an anti-corrosive barrier over said surface, and optionally further comprising a moisture retentive barrier forming material in an amount effective for forming a moisture retentive barrier over said surface, wherein said anti-corrosion agent is packaged for delayed release.

18. The method of claim 17, wherein said anti-corrosion agent is encapsulated.

19. A method for preventing oxidative corrosion of a metal, comprising:
applying an anti-corrosion composition to a surface of a metal or a device containing a metal susceptible to oxidative corrosion, said composition comprising an amount of an anti-corrosion agent comprising a lower alkyl carboxylic acid moiety that is derived from a C1-C6 carboxylate and is effective for forming an anti-corrosive barrier over said surface, and optionally further comprising a moisture retentive barrier forming material in an amount effective for forming a moisture retentive barrier over said surface.

20. The method of claim 19, wherein said C1-C6 carboxylate is selected from the group consisting of formate, acetate, propionate, butyrate, and 2-methyl propionate, and mixtures thereof.

21. The method of claim 20, wherein said C1-C6 carboxylate comprises a cation selected from alkali metal or alkaline earth metal cations.

22. The method of claim 21, wherein said cation is sodium.

23. The method of claim 16, wherein said lower alkyl carboxylic acid moiety is derived from sodium propionate.

24. A method for preventing oxidative corrosion of a metal, comprising:
applying an anti-corrosion composition to a surface of a metal or a device containing a metal susceptible to oxidative corrosion, said composition comprising an amount of an anti-corrosion agent comprising a lower alkyl carboxylic acid moiety effective for forming an anti-corrosive barrier over said surface, a benzoic moiety, and optionally further comprising a moisture retentive barrier forming material in an amount effective for forming a moisture retentive barrier over said surface.

25. A method for preventing oxidative corrosion of a metal, comprising:
applying an anti-corrosion composition to a surface of a metal or a device containing a metal susceptible to oxidative corrosion, said composition comprising an amount of an anti-corrosion agent comprising a lower alkyl carboxylic acid moiety effective for forming an anti-corrosive barrier over said surface, and optionally further comprising a moisture retentive barrier forming material in an amount effective for forming a moisture retentive barrier over said surface, wherein said lower alkyl carboxylic acid moiety comprises a propionic anion, and wherein the composition further comprises a 2,4-trans, trans-hexadienoic anion and a benzoic anion.

26. A method for preventing oxidative corrosion of a metal, said method comprising the steps of:
providing a metal or a device containing a metal wherein said metal is susceptible to oxidative corrosion;
providing an anti-corrosion solution, said solution comprising an effective amount of an anti-corrosion agent dissolved in a polar solvent, said agent comprising a C1-C6 carboxylic acid moiety in the form of a propionic anion; and
continuously immersing said metal or said device in said solution.

* * * * *

UNITED STATES PATENT AND TRADEMARK OFFICE
CERTIFICATE OF CORRECTION

PATENT NO. : 7,264,847 B2
APPLICATION NO. : 10/606946
DATED : September 4, 2007
INVENTOR(S) : Paul D. Manos It is certified that error appears in the above-identified patent and that said Letters Patent is hereby corrected as shown below:

Column 17:

Line 19: "claim 1, wherein said at least further" should read --claim 1, further--

Signed and Sealed this

Eighth Day of April, 2008

JON W. DUDAS
*Director of the United States Patent and Trademark Office*